United States Patent
Strock

(10) Patent No.: US 11,268,042 B2
(45) Date of Patent: Mar. 8, 2022

(54) ABRADABLE COATING HBN FILLER MATERIAL AND METHOD OF MANUFACTURE

(71) Applicant: Raytheon Technologies Corporation, Farmington, CT (US)

(72) Inventor: Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/870,472

(22) Filed: May 8, 2020

(65) Prior Publication Data

US 2021/0348077 A1 Nov. 11, 2021

(51) Int. Cl.
*C10M 111/04* (2006.01)
*C10M 103/00* (2006.01)
*C09K 3/14* (2006.01)

(52) U.S. Cl.
CPC ......... *C10M 103/00* (2013.01); *C09K 3/1436* (2013.01); *C09K 3/1463* (2013.01); *C09K 3/1481* (2013.01); *C10M 2201/087* (2013.01); *C10M 2201/103* (2013.01)

(58) Field of Classification Search
CPC .......... C10M 103/00; C10M 2201/103; C10M 2201/087; C09K 3/1481; C09K 3/1436; C09K 3/1463
USPC ........................................................ 508/155
See application file for complete search history.

(56) References Cited

U.S. PATENT DOCUMENTS

| 5,409,622 | A | 4/1995 | Chapman et al. |
| 7,763,573 | B2 | 7/2010 | Hajmrle et al. |
| 2005/0124505 | A1* | 6/2005 | Hajmrle ............ C04B 35/62655 508/155 |
| 2018/0230842 | A1 | 8/2018 | Liu et al. |

FOREIGN PATENT DOCUMENTS

| CN | 102660370 A | 9/2012 |
| CN | 107805489 A | 3/2018 |

OTHER PUBLICATIONS

EP Search Report dated Sep. 30, 2021 issued for corresponding European Patent Application No. 21173091.6.

* cited by examiner

*Primary Examiner* — Prem C Singh
*Assistant Examiner* — Francis C Campanell
(74) *Attorney, Agent, or Firm* — Bachman & LaPointe, P.C.

(57) ABSTRACT

A process for solid lubricant filler powder used in abradable coating manufacture comprising mixing a bentonite clay and a hexagonal boron nitride powder to form a mixture of the bentonite clay and the hexagonal boron nitride powder; consolidating the bentonite clay and the hexagonal boron nitride powder to form a composite material; heat treating the composite material to at least 500 degrees centigrade; breaking up the composite material into a variety of sizes; and segregating the composite material to produce a final product of free flowing, low dust powder of composite hexagonal boron nitride and calcined bentonite.

16 Claims, 3 Drawing Sheets

ABRADABLE COATING HBN FILLER MATERIAL AND METHOD OF MANUFACTURE

BACKGROUND

The present disclosure is directed to the improved process to produce solid lubricant filler powder used in abradable coating manufacture.

Conventional crushed hBN has poor flow and deposition characteristics that lead to inefficient and poorly controlled manufacturing processes for abradable coatings. Agglomeration of this material by spray drying with the desirable bentonite binder material is inefficient and has poor repeatability due to low material density and incompatibility with standard processing equipment. The bentonite binder not only acts to bind the agglomerates, but also aids in thermal spray deposition due to non-melting behavior of hBN. It is desired to have a low dust (<5 wt % at <=11 micron), free flowing hBN powder with bentonite binder in order to achieve a stable and efficient manufacturing process for abradable coatings.

SUMMARY

In accordance with the present disclosure, there is provided process for solid lubricant filler powder used in abradable coating manufacture comprising mixing a bentonite clay and a hexagonal boron nitride powder to form a mixture of the bentonite clay and the hexagonal boron nitride powder; consolidating the bentonite clay and the hexagonal boron nitride powder to form a composite material; heat treating the composite material to at least 500 degrees centigrade; breaking up the composite material into a variety of sizes; and segregating the composite material to produce a final product of free flowing, low dust powder of composite hexagonal boron nitride and calcined bentonite.

A further embodiment of any of the foregoing embodiments may additionally and/or alternatively include the process further comprising recycling the composite material that is deemed to be too coarse and too fine.

A further embodiment of any of the foregoing embodiments may additionally and/or alternatively include the process wherein the step of breaking up the composite material into a variety of sizes comprises crushing the composite material.

A further embodiment of any of the foregoing embodiments may additionally and/or alternatively include the process further comprising pressing the mixture of the bentonite clay and the hexagonal boron nitride powder.

A further embodiment of any of the foregoing embodiments may additionally and/or alternatively include the process further comprising applying a calcine heat treatment to the mixture of the bentonite clay and the hexagonal boron nitride powder after at least one of drying the composite material; and de-bindering the composite material.

A further embodiment of any of the foregoing embodiments may additionally and/or alternatively include the step of pressing comprises at least one of roll pressing the mixture of the bentonite clay and the hexagonal boron nitride powder, and extruding the mixture of the bentonite clay and the hexagonal boron nitride powder.

A further embodiment of any of the foregoing embodiments may additionally and/or alternatively include the process further comprising adding a binder with the hexagonal boron nitride and the bentonite clay prior to the mixing step.

A further embodiment of any of the foregoing embodiments may additionally and/or alternatively include the hexagonal boron nitride is crushed prior to mixing with the bentonite clay.

A further embodiment of any of the foregoing embodiments may additionally and/or alternatively include the step of segregating the composite material comprises segregating the composite material based on size selected from the group consisting of a coarse size, a fine size and a desired fraction size.

A further embodiment of any of the foregoing embodiments may additionally and/or alternatively include the process prior to the step of mixing a bentonite clay and a hexagonal boron nitride powder to form a mixture of the bentonite clay and a hexagonal boron nitride powder, further comprising combining the bentonite clay with water and a dispersant; and ball milling the bentonite clay, the water and the dispersant.

A further embodiment of any of the foregoing embodiments may additionally and/or alternatively include the process after the combining step further comprising mixing the bentonite clay, the water, the dispersant, and the hexagonal boron nitride in a disperser mixer.

A further embodiment of any of the foregoing embodiments may additionally and/or alternatively include the process further comprising tape casting the mixture after the step of mixing.

A further embodiment of any of the foregoing embodiments may additionally and/or alternatively include the step of heat treating comprises calcine heat treatment.

A further embodiment of any of the foregoing embodiments may additionally and/or alternatively include the process further comprising at least one of extruding the mixture; tape casting the mixture; roll compressing the mixture; wherein a thickness of the extruded, tape cast or roll compressed mixture includes a heat treated thickness that corresponds to a desired fraction size.

A further embodiment of any of the foregoing embodiments may additionally and/or alternatively include the desired fraction size ranges from 10 to 150 microns.

A further embodiment of any of the foregoing embodiments may additionally and/or alternatively include the process further comprising bindering the composite material; and de-bindering the composite material.

A further embodiment of any of the foregoing embodiments may additionally and/or alternatively include the heat treating can include a minimum temperature of 500 degrees Centigrade and range as high as 1000 degrees Centigrade.

The process is to form a composite of calcined bentonite and hBN by one of several manufacturing methods and then to fracture the composite into particles, treat the particles for flowability and size the particles for use in thermal spray.

Other details of the process are set forth in the following detailed description and the accompanying drawings wherein like reference numerals depict like elements.

DETAILED DESCRIPTION

Figure 1:
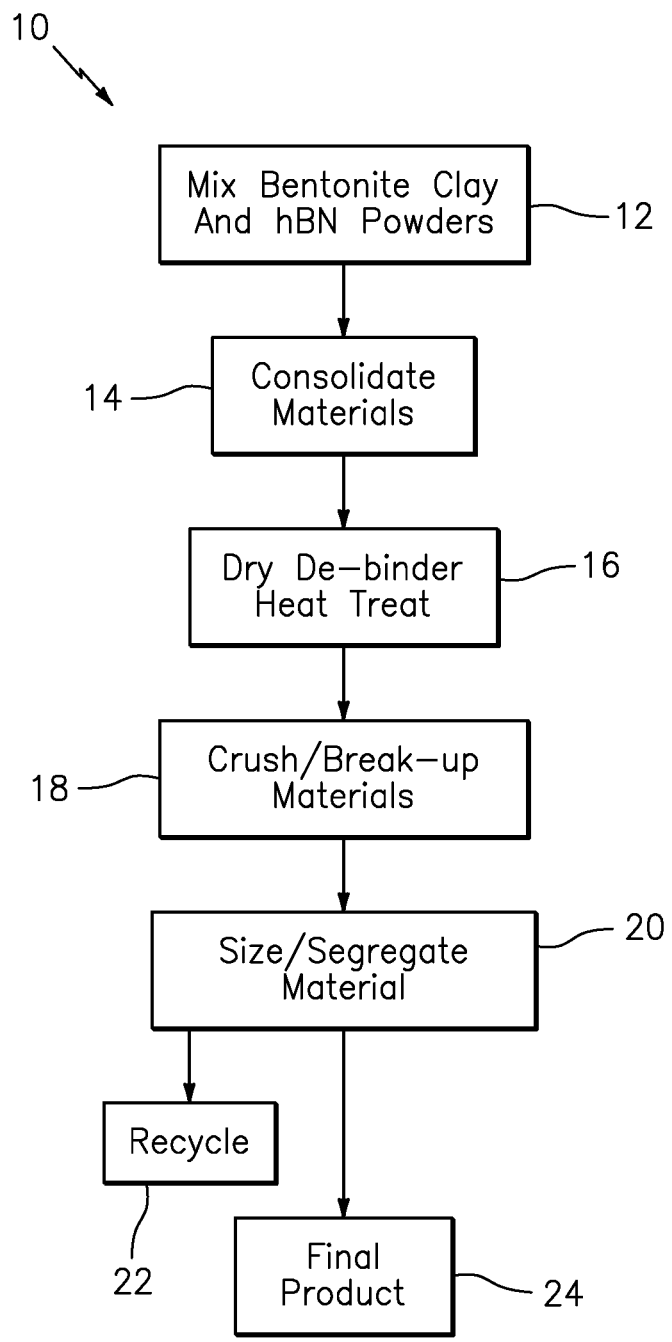
FIG. 1 is a process diagram of an exemplary process.
Figure 2:
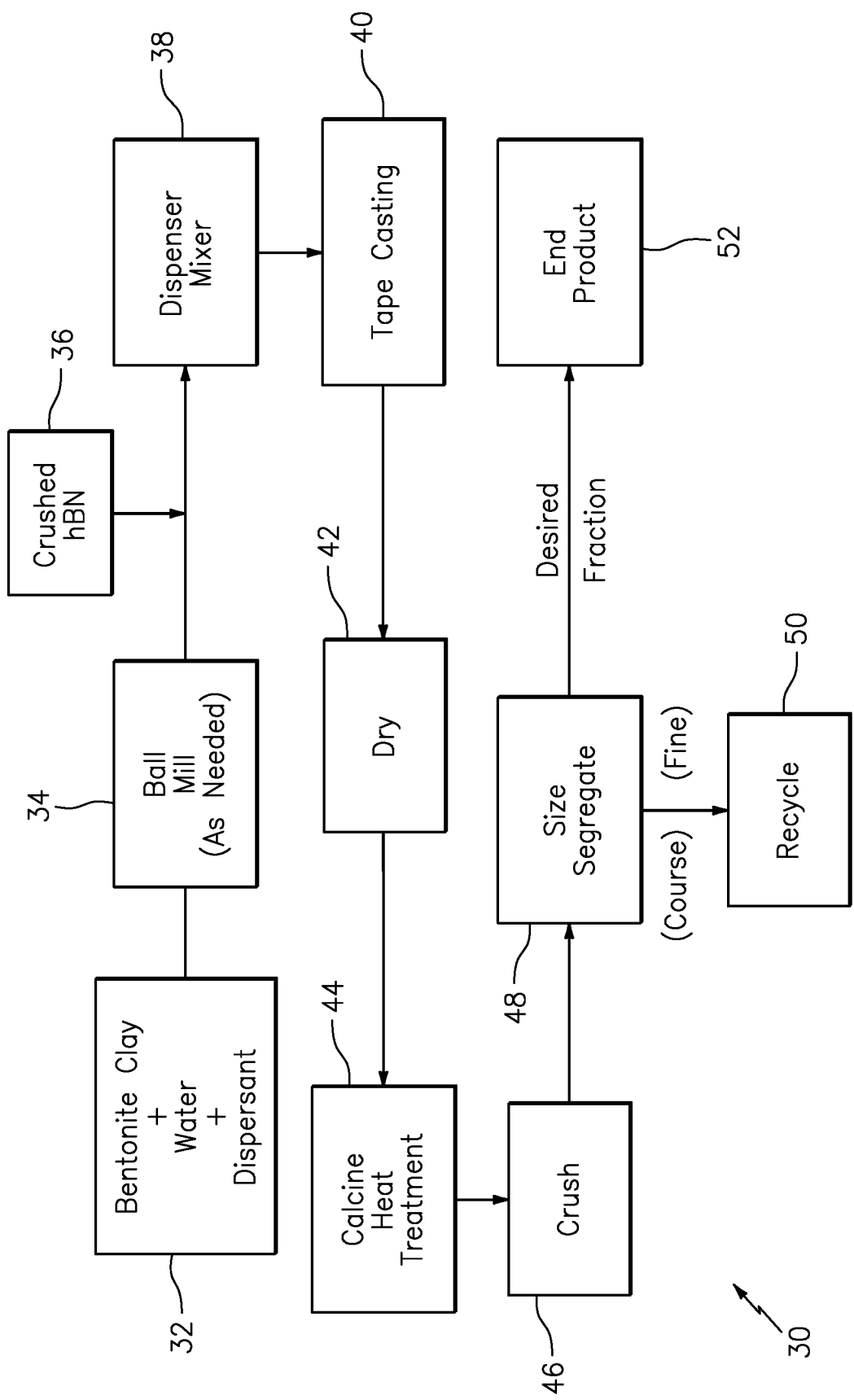
FIG. 2 is a process diagram of an exemplary process.
Figure 3:
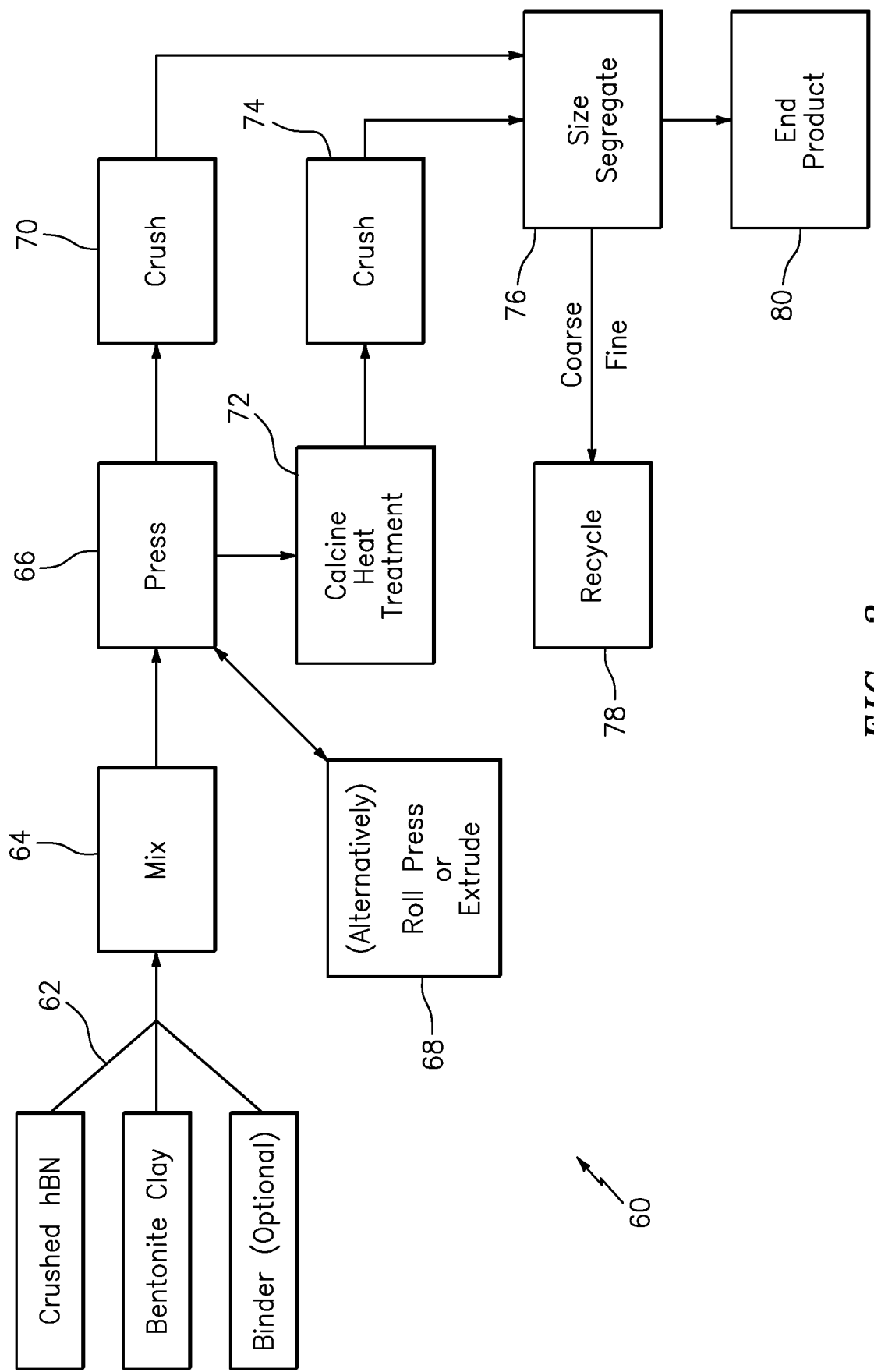
FIG. 3 is a process diagram of an exemplary process.

Referring to FIG. 1, a process diagram discloses the exemplary process for producing solid lubricant filler powder used in abradable coating manufacture. The process 10 is to form a composite of calcined bentonite and hBN by one of several manufacturing methods and then to fracture the composite into particles, treat the particles for flowability and size the particles for use in thermal spray. At step 12, bentonite clay and hexagonal boron nitride (hBN) powders are mixed. The bentonite clay can include $Al_2H_2O_6Si$. The material can include aluminosilicates or mixtures of aluminum oxide and silicon oxide. In an exemplary embodiment, the bentonite clay and hBN can be mixed with optional fugitive solvents and binders such as wax, acrylic or polyvinyl alcohol (PVA), water-soluble synthetic polymer and the like. At step 14, the process involves consolidating the materials to form a composite by bulk pressing, tape casting or extruding. (Tape casting and extrusion may provide a benefit to manufacturing yield and consistency of particle size as thickness of the material may be on the order of the desired particle size). At step 16, the process includes drying, de-binding and calcine heat treating of the composite materials in a batch or a continuous process (in air). The step of heat treating the composite materials can be performed at a minimum temperature of 500 degrees Centigrade, more desirably 750 degrees Centigrade and as high as 1000 degrees Centigrade. Higher temperatures makes the agglomerate stronger. Calcination removes the water molecules from the clay and further heat treatment sinters the bentonite. At step 18, the process includes crushing or breaking up the calcined material to form angular particles. In an alternative embodiment, it is possible to crush the composite material prior to calcining. In an alternative optional embodiment, it is possible to tumble or agitate the composite material particles to round sharp edges and corners to improve powder flow characteristics. At step 20, the process includes sizing the composite material and segregating the composite material. At step 22, optionally in the process, removing and recycling the undesirable size fraction of the composite materials can be performed. Desirable sizes of the composite material for thermal spray can be from 10 to 150 microns. In an exemplary embodiment the size of the composite material can be from 12 to 100 microns. In another exemplary embodiment the size of the composite material can be from 16 to 75 microns. A composite material can have a median value of D50 size, or a size at which 50 wt % is both coarser and finer, would be 20 to 75 microns or from 22 to 50 microns or from 25 to 35 microns, (respectively). At step 24, the process produces the final product comprising a free flowing, low dust (<5 wt % at <=11 micron), powder of composite hBN and calcined bentonite.

Referring also to FIG. 2 an exemplary process diagram illustrates an alternative process 30 to create the final product. At step 32 of the process, bentonite clay water and dispersant are provided. At step 34, the bentonite clay with water and dispersant may optionally be ball milled as needed to prepare the bentonite clay for mixing. At step 36 crushed hBN is combined with the bentonite clay with water and dispersant. At step 38 the composition of the hBN with bentonite clay with water and dispersant is mixed in a disperser mixer. At step 40 the composition is processed in a tape casting machine. The thickness of a roll pressed, extruded or tape cast preform would be such that the smallest thickness or width dimension would be larger than, or preferably equal to a maximum particle size dimension after heat treatment. In an exemplary embodiment, for a tape cast slurry of ⅓ volume loading of solids, the wet thickness would be 3× the desired calcined particle size. For example, for a 50 micron calcined particle, it would be desired to have a 150 micron thick wet tap. The tape casting output composition is then dried at step 42. The composition is calcine heat treated at step 44. The output composition from the calcine heat treatment is then crushed at step 46 to produce a composite material of varying sizes. At step 48, the composite material is segregated by size. The composite material that is sized as being too coarse or too fine is recycled at step 50. The desired fraction size of composite material is sent out as final product at step 52, resulting in a free flowing, low dust, powder of composite hBN and calcined bentonite.

FIG. 3 includes another exemplary embodiment of the process 60 to produce the composite. At step 62 crushed hBN, bentonite clay and an optional binder (organic additive) are combined and then mixed at step 64. The binder/organic additive can include wax, stearate or polymer and the like. After mixing, the composition is pressed at step 66. Alternatively, shown at step 68, the composition can be roll pressed or extruded. At step 70 the composition can be crushed. In an alternative, the composition can receive a calcine heat treatment at step 72 before being crushed at step 74. After being crushed, the composite material can be size segregated at step 76. The composite material that is too coarse or too fine can be recycled at step 78. The end product is produced at step 80.

The process steps disclosed in FIG. 1, FIG. 2 and FIG. 3 can be interchanged, added and omitted as deemed necessary.

A technical advantage of the disclosed process includes the production of a composite material that is well suited for thermal spray as a soft, dry lubricant filler in abradable coatings.

Another technical advantage of the disclosed process includes production of a composite material having a consistency of composition and particle characteristics that can result in a more repeatable abradable coating process compared with composite hBN+calcined bentonite produced by conventional spray dry agglomeration methods.

Another technical advantage of the disclosed process includes a manufacturing process of the materials that is more repeatable in particle size, density and composition and has better process yield than the prior spray dry agglomeration processes.

There has been provided a process to produce solid lubricant filler powder used in abradable coating manufacture. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for solid lubricant filler powder used in abradable coating manufacture comprising:

mixing a bentonite clay and a hexagonal boron nitride powder to form a mixture of said bentonite clay and said hexagonal boron nitride powder;

consolidating the bentonite clay and the hexagonal boron nitride powder utilizing tape casting to form a composite material;

heat treating the composite material to at least 500 degrees centigrade;

breaking up the composite material into a variety of sizes; and segregating the composite material to produce a final product of low dust powder of composite hexagonal boron nitride and calcined bentonite.

2. The process according to claim 1, further comprising:
recycling said composite material that is deemed to be too coarse and too fine.

3. The process according to claim 1, wherein said step of breaking up the composite material into a variety of sizes comprises crushing said composite material.

4. The process according to claim 1, further comprising:
applying a calcine heat treatment to said mixture of said bentonite clay and said hexagonal boron nitride powder after
drying the composite material.

5. The process according to claim 1, wherein said step of pressing comprises at least one of:
roll pressing said mixture of said bentonite clay and said hexagonal boron nitride powder, and
extruding said mixture of said bentonite clay and said hexagonal boron nitride powder.

6. The process according to claim 1, further comprising:
adding a binder with said hexagonal boron nitride and said bentonite clay prior to said mixing step.

7. The process according to claim 1, wherein said hexagonal boron nitride is crushed prior to mixing with the bentonite clay.

8. The process according to claim 1, wherein said step of segregating the composite material comprises segregating said composite material based on size selected from the group consisting of a coarse size, a fine size and a desired fraction size.

9. The process according to claim 1, prior to said step of mixing a bentonite clay and a hexagonal boron nitride powder to form a mixture of said bentonite clay and a hexagonal boron nitride powder, further comprising:
combining said bentonite clay with water and a dispersant; and
ball milling the bentonite clay, the water and the dispersant.

10. The process according to claim 9, further comprising:
mixing the bentonite clay, the water, the dispersant, and the hexagonal boron nitride in a disperser mixer.

11. The process according to claim 1, wherein said step of heat treating comprises calcine heat treatment.

12. The process according to claim 10, further comprising:
drying the composite material.

13. The process according to claim 10,
wherein a thickness of the tape cast mixture includes a heat treated thickness that corresponds to a desired fraction size.

14. The process according to claim 13, wherein said desired fraction size ranges from 10 to 150 microns.

15. The process according to claim 1, further comprising:
bindering the composite material; and
de-bindering the composite material.

16. The process according to claim 1 wherein said heat treating can include a minimum temperature of 500 degrees Centigrade and range as high as 1000 degrees Centigrade.

* * * * *